United States Patent [19]

Sullivan

[11] 4,196,895
[45] Apr. 8, 1980

[54] RING-LOADED FLEXURAL DISC SPRING

[75] Inventor: Timothy D. Sullivan, East Haddam, Conn.

[73] Assignee: The United States of America as represented by the Secretary of the Navy, Washington, D.C.

[21] Appl. No.: 926,781

[22] Filed: Jul. 21, 1978

[51] Int. Cl.² ............................................. F16F 1/32
[52] U.S. Cl. .................................. 267/160; 248/560; 248/618; 267/158
[58] Field of Search ...................... 267/63 R, 140, 141, 267/141.4, 153, 158, 160, 161, 162; 151/38; 248/560, 618, 632, 634, 635

[56] References Cited

U.S. PATENT DOCUMENTS

| | | | |
|---|---|---|---|
| 1,641,059 | 8/1927 | Tausch | 267/162 |
| 2,464,152 | 3/1949 | Ralston | 151/38 |
| 2,973,015 | 2/1961 | Thompson | 267/162 |
| 3,161,389 | 12/1964 | Beine | 267/161 |
| 3,224,344 | 12/1965 | Baumann et al. | 267/162 |
| 3,884,457 | 5/1975 | Leko | 267/162 |

FOREIGN PATENT DOCUMENTS 544232  1/1932  Fed. Rep. of Germany ............ 151/38

*Primary Examiner*—Edward R. Kazenske
*Attorney, Agent, or Firm*—Richard S. Sciascia; Arthur A. McGill; Prithyi C. Lall

[57] ABSTRACT

A ring-loaded flexural disc spring acts as an isolation mount in a thin cylindrical space in the tail of a longitudinal vibrator type of underwater sound transducer. The ring-loaded spring comprises a thin disc having a raised bearing surface at a specified distance from the perimeter on one side of the disc and a raised bearing surface at the perimeter on the other side of the disc. The spring flexes into a concave shape when a load is applied. The operation of the disc is linear over the entire specified load range.

5 Claims, 10 Drawing Figures

RING-LOADED FLEXURAL DISC SPRING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to spring mechanisms and more particularly to a flexural disc spring for acting as an isolation mount for the tail mass of an underwater sound transducer.

Several types of tail mount isolation springs are in use. Multiple layers of thin paper provide the desired stiffness quietly and reliably, but as maximum load requirements increase, the elastic limit of the layered paper is reached and the required stiffness cannot be maintained over the entire load range. Composite plastic materials used in the bulk compression mode provide the required stiffness over whole load range, but produce noise levels which interfere with transducer operation. Other known springs are available that provide the proper stiffnes at low cost, but have areas of high stress concentration and high relative motion which cause low fatigue strength and noise. These springs also have complex stress behavior not easily subjected to mathematical analysis, so that stress levels and dynamic stiffness of these configurations cannot always be accurately predicted.

SUMMARY OF THE INVENTION

It is therefore a general object of the present invention to provide an improved isolation spring. It is a further object that the spring be suitable as an isolation mount for the tail mass of a longitudinal vibrator type of underwater sound transducer. An additional object is that the spring operates linearly over the entire specified load range. These and other objects of the invention and the various features and details of construction and operation will become apparent from the specification and drawings.

This is accomplished in accordance with the present invention by providing a flexural disc spring having a single raised rounded ring bearing on each side of a disc. On loading, the disc flexes to a concave shape. The shape of the ring bearings allows a rolling action between surfaces when this flexure takes place. One ring bearing is located at the periphery of the disc and the other at a distance 0.62 times the radius of the disc from the disc center for optimum performance. The disc springs are suitable for use individually or in tandem. The ring bearings can form an integral part of the disc spring or can be separate units.

DESCRIPTION OF THE PREFERRED EMBODIMENTS

Figure 1:
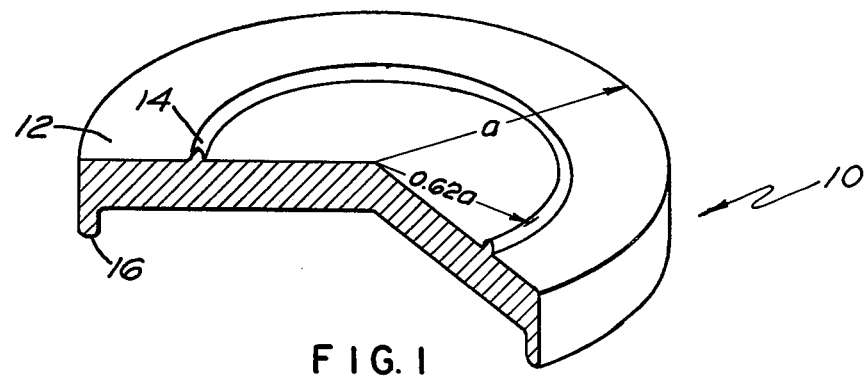
FIG. 1 is a perspective view, partly in section, of a disc spring in accordance with the present invention.

Referring now to FIG. 1 there is shown a ring-loaded flexural disc spring 10 designed for use either singly or in series in thin cylindrical spaces in underwater sound transducers of the longitudinal vibrator type. The spring 10 is essentially a thin disc 12 having thickness less than one-tenth the diameter of the disc. The disc 12 has a raised ring shaped bearing surface 14 located at 0.62 times the radius from the center of the disc 12, on one side of the disc. Another ring shaped bearing surface 16 is located at the perimeter of the disc 12 on the opposite side of disc 12 than bearing surface 14. The bearing surfaces 14 and 16 are slightly rounded to provide a line contact in order to better define spring stiffness and to allow a rolling action between surfaces as the spring 10 flexes.

Figure 2:
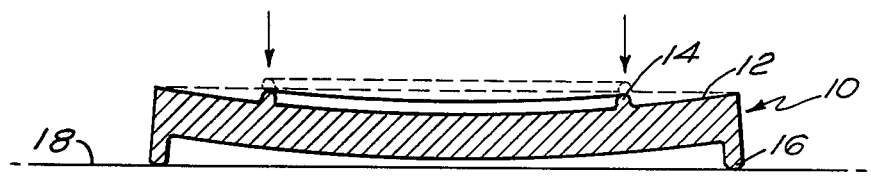
FIG. 2 is a sectional view of the operation of the disc spring of FIG. 1 while under load.
Figure 3:
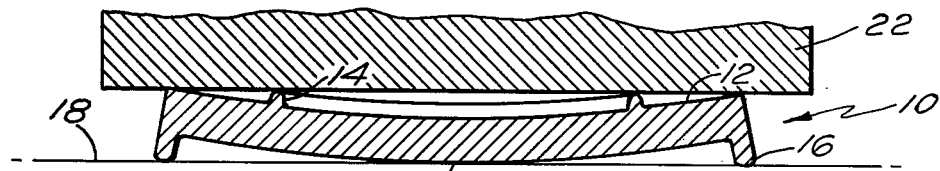
FIG. 3 is a sectional view of the operation of the disc spring of FIG. 1 while under overload conditions.

FIG. 2 shows the disc spring 10 operating by flexing into a concave shape when a load is applied to bearing surface 14 in the direction of the arrows. The spring 10 is supported at bearing surface 16 by a support base 18. Maximum spring deflection, calculated at the disc 12 center, is designed to be less than 0.4 the thickness of the disc 12 to insure that internal stresses and spring stiffness will be linear over the entire load range. The disc 12 thickness of spring 10 is calculated so that the maximum stresses generated during the loading do not exceed material elasticity limits, and that for extended cycling, stress levels are below the maximum permitted for the intended maximum full load cycles. Equations well known in the art have been developed to do this. Strain energy is stored in the volume of the disc material 12 as a result of spring deflection and released again as the load is removed. This particular shape of spring 10 is very efficient for thin cylindrical spaces due to the relatively even storage of strain energy over the disc 12. The hoop strains and radial strains are equal when the radius of bearing $14 \leq 0.62$ a. The spring stiffness k in lbs. of load per inch of deflection is calculated using the deflection measured at bearing surface 14. The height of either or both bearing surfaces 14 and 16 can be calculated so that the disc spring 10 will bottom out prior to exceeding the elastic limit of the spring material, in order to prevent spring damage. FIG. 3 shows this bottoming out at area 20 as a load 22 is applied. Thus the spring 10 can survive much greater loads 22 than those at which it was designed to operate. The location of bearing surface 14 at 0.62 a produces the greatest compliance per unit maximum stress for this spring 10. This is desirable in current usages.

Figure 4:
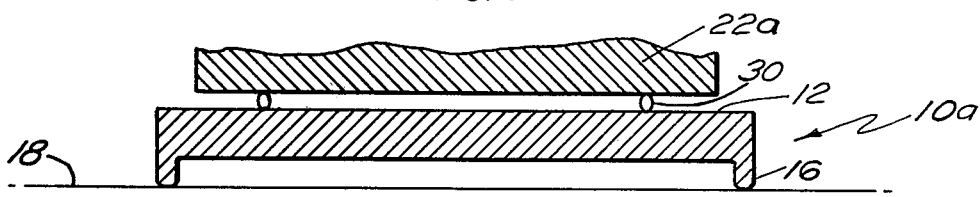
FIGS. 4-6 are sectional views showing alternate embodiments of the present invention.
Figure 5:
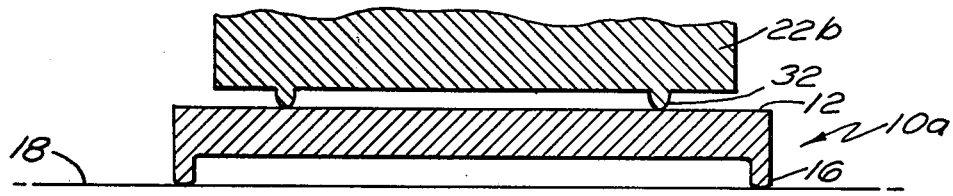

FIG. 4 shows a disc spring 10a supporting a load 22a by means of a separate ring 30 instead of an incorporated raised ring. FIG. 5 shows a raised ring shaped bearing surface 32 incorporated as part of a load 22b.

Figure 6:
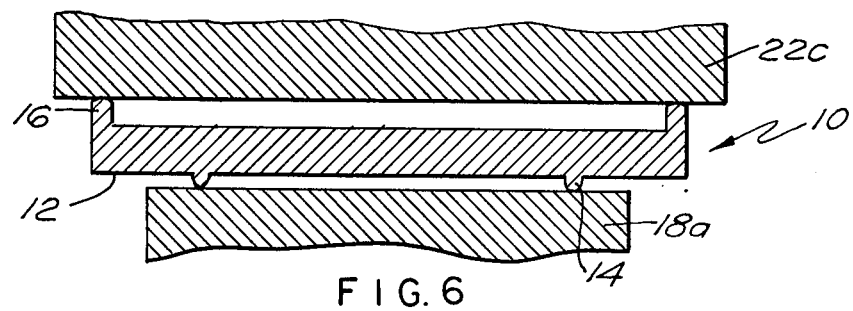

FIG. 6 depicts an extended load 22c being loaded on outer ring 16 and supported on inner ring 14 by a shortened support 18a.

Figure 7:
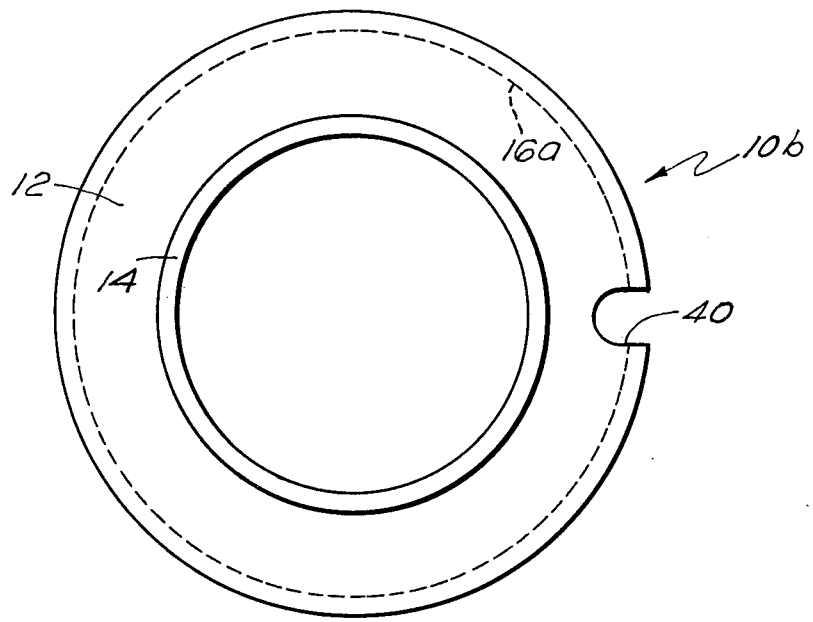
FIG. 7 is a top view showing a modification of the disc spring of FIG. 1.

FIG. 7 shows a notch 40 in the disc spring 10b circumference to allow for passage of control cables, wiring, etc. This changes the geometry in disc 12a and bearing surface 16a but does not significantly alter the spring properties.

Figure 8:
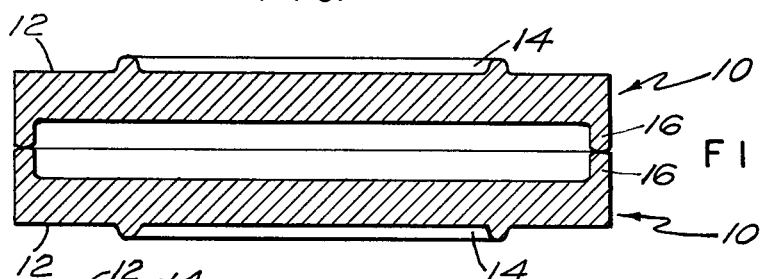
FIGS. 8-10 are sectional views showing alignments of a plurality of various disc springs.
Figure 9:
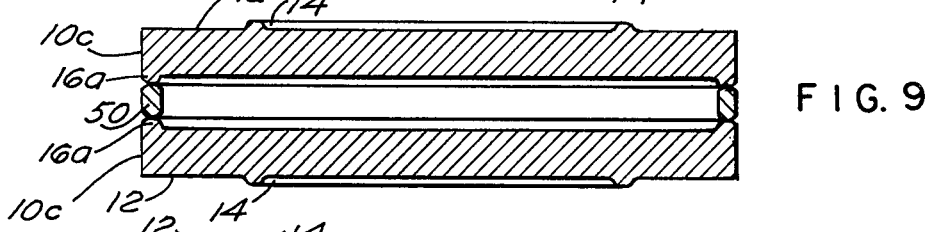
Figure 10:
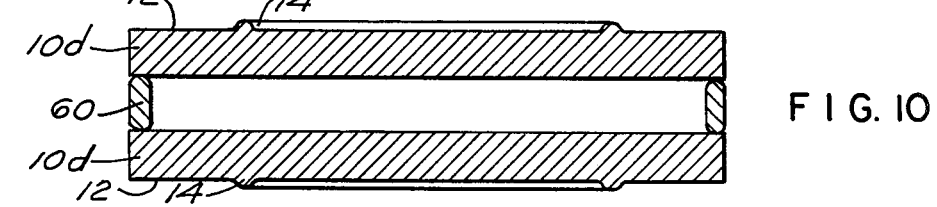

FIGS. 8, 9 and 10 show the use of multiple spring discs. In FIG. 8 two disc springs 10 are placed back to back. A slight radial motion is produced at ring shaped bearing surface 16. Since the minimum height of bearing surface 16 is dictated by the maximum expected deflection at the disc 12 center, a spacing ring 50 of the appropriate height may be inserted between the two springs 10b allowing the height of the outer bearing 16a to be reduced to a minimum as shown in FIG. 9. FIG. 10 shows the disc springs 10d with spacing ring 60 having rounded bearing surfaces at the top and bottom.

There has, therefore, been described flexural disc springs for use as isolation mounts. Predictions of maximum stress levels and fatigue life can be made with relative accuracy, thus reducing the occurrence of failures. Acoustic emissions due to relative motion of adjoining metal surfaces are minimized in these designs in two ways. First, bearing surfaces are slightly rounded to allow rolling between surfaces and easier sliding when it does occur. Second, the spring is designed for two units to be used in series so that bearing surfaces of adjacent units are together. Radial motion at the interface of the surfaces thus causes no rubbing because both surfaces move together. Additional advantages of the invention are that no acoustic emissions are generated by the spring material during operation, the design makes feasible low cost mass production techniques such as stamping for forging, and the design allows a very compliant spring for a specified thin cylindrical volume.

It will be understood that various changes in the details, materials, steps and arrangement of parts, which have been described and illustrated in order to explain the nature of the invention, may be made by those skilled in the art within the principle and scope of the invention as expressed in the appended claims.

What is claimed is:

1. A flexural disc spring comprising a flexible imperforate disc having opposing sidewalls extending from the center axis thereof to the rim of said disc, said flexible disc having a first integral raised circular bearing surface on one of said opposing sidewalls of said disc and concentric with said disc, said first bearing surface being located substantially at the perimeter of said disc, and a second integral raised circular bearing surface on the other of said opposing sidewalls of said disc and concentric with said disc, said second bearing surface being a distance of substantially 0.62 times the radius of said disc from the center of said disc, said first and second bearing surfaces being rounded when viewed in cross-section, at least one of said first and second bearing surfaces being of a height to provide for a maximum deflection at the center of said disc, in the direction of said one bearing surface, of less than four-tenths the thickness of said disc when said disc is in operation.

2. A flexural disc spring according to claim 1 wherein said disc has a thickness less than one-tenth the diameter of said disc.

3. A flexural disc spring system comprising:
    a flexural imperforate disc having opposing sidewalls extending from the center axis thereof to the rim of said disc and an integral raised circular bearing surface on one of said opposing sidewalls of said disc, said bearing surface being located substantially at the perimeter of said disc, said bearing surface being rounded when viewed in cross-section, said bearing surface being of a height to provide for a maximum deflection at the center of said disc, in the direction of said bearing surface, of less than four-tenths the thickness of said disc; and
    a ring concentrically located with respect to said flexural disc and abutting said flexural disc on the sidewall of said disc opposite to that having said raised bearing surface, said ring having a radius substantially 0.62 times the radius of said disc.

4. A flexural disc spring system according to claim 3 wherein said disc has a thickness less than one-tenth the diameter of said disc.

5. A flexural disc spring comprising:
    first and second flexible imperforate discs, each having an integral raised circular bearing surface on one side of each of said discs, each of said bearing surfaces being concentric with said disc and being a distance of substantially 0.62 times the radius of said disc, each of said bearing surfaces being rounded when viewed in cross-section, said first and second disc being substantially equal in radius; and
    a ring concentrically abutting each of said first and second flexible discs on the sides of said discs opposite to that having said raised bearing surface, said ring having a radius substantially equal to that of said first and second discs.

* * * * *